(12) United States Patent
Su et al.

(10) Patent No.: US 11,188,057 B2
(45) Date of Patent: Nov. 30, 2021

(54) DRILLING SYSTEM AND METHOD THEREOF

(71) Applicant: INDUSTRIAL TECHNOLOGY RESEARCH INSTITUTE, Hsinchu (TW)

(72) Inventors: Guan-Wei Su, Tainan (TW); Chen-Yu Kai, Ligang Township (TW); Kai-Ming Pan, Taoyuan (TW); Jun-Yi Jiang, Nantou (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 130 days.

(21) Appl. No.: 16/821,354

(22) Filed: Mar. 17, 2020

(65) Prior Publication Data

US 2021/0162513 A1 Jun. 3, 2021

(30) Foreign Application Priority Data

Dec. 3, 2019 (TW) ................................. 108144073

(51) Int. Cl.
*G05B 19/416* (2006.01)
*B23Q 17/09* (2006.01)
*B23Q 15/12* (2006.01)

(52) U.S. Cl.
CPC ......... *G05B 19/4166* (2013.01); *B23Q 15/12* (2013.01); *B23Q 17/0961* (2013.01); *B23Q 17/0966* (2013.01)

(58) Field of Classification Search
None
See application file for complete search history.

(56) References Cited

U.S. PATENT DOCUMENTS

| 5,116,168 | A | * | 5/1992 | Aihara | ............... | G05B 19/4163 408/1 R |
| 5,404,633 | A | | 4/1995 | Givler | | |

(Continued)

FOREIGN PATENT DOCUMENTS

| CN | 101670448 A | 3/2010 |
| CN | 203418368 U | 2/2014 |
| CN | 104602873 A | 5/2015 |
| CN | 104759658 A | 7/2015 |

(Continued)

OTHER PUBLICATIONS

Feito et al., "Numerical prediction of delamination in CFRP drilling", Composite Structures, Feb. 2014, vol. 108, pp. 677-683, http://dx.doi.org/10.1016/j.compstruct.2013.10.014.

(Continued)

*Primary Examiner* — Ryan A Jarrett
(74) *Attorney, Agent, or Firm* — Birch, Stewart, Kolasch & Birch, LLP

(57) ABSTRACT

A drilling system including a feed control module, a force control module, a hole breaking control module, a conversion module and a computing unit is provided. The feed control module sets a feed force threshold and a feed speed threshold for the computing unit to determine whether the current mode satisfies a first conversion condition. The hole breaking control module sets a drilling penetration force threshold and a drilling penetration speed threshold for the computing unit to determine whether the current mode satisfies a second conversion condition. The conversion module informs to change the feed force and the feed speed according to the determination results of the two conversion conditions. The force control module provides the feed force. With the drilling system, possible impact on the workpiece due to resistance change which occurs when the (Continued)

drill just touches and nearly gets through the workpiece will be reduced.

13 Claims, 5 Drawing Sheets

(56) References Cited

U.S. PATENT DOCUMENTS

| | | | |
|---|---|---|---|
| 5,599,142 | A | 2/1997 | Fujimoto et al. |
| 6,650,960 | B2 | 11/2003 | Kakino et al. |
| 8,511,945 | B2 | 8/2013 | Apkarian et al. |
| 2012/0141218 | A1 | 6/2012 | Saito et al. |
| 2013/0189043 | A1* | 7/2013 | Uchiuzo ............ G05B 19/4163 408/1 R |

FOREIGN PATENT DOCUMENTS

| | | |
|---|---|---|
| CN | 105500147 A | 4/2016 |
| CN | 106827253 B | 10/2018 |
| CN | 209174956 U | 7/2019 |
| TW | 220156 | 2/1994 |
| TW | 201922437 A | 6/2019 |
| WO | WO 2016/066615 A2 | 5/2016 |
| WO | WO 2016/066615 A3 | 5/2016 |

OTHER PUBLICATIONS

Jung et al., "Force Tracking Impedance Control for Robot Manipulators with an Unknown Environment: Theory, Simulation, and Experiment", The International Journal of Robotics Research, 2001, vol. 20, pp. 765-774, http://ijr.sagepub.com/content/20/9/765.

Lee et al., "Force control and breakthrough detection of a bone drilling system", Proceedings of the 2003 IEEE International Conference on Robotics & Automation, Taipei, Taiwan, Sep. 14-19, 2003, pp. 1787-1792.

Lee, "Position and Force Servo Control of a 1-DOF Mechanical System: Theory and Experiment", 2013, total 55 pages.

Lin et al., "Identification and Compensation of Nonlinear Friction Characteristics and Precision Control for a Linear Motor Stage", IEEE/ASME Transactions on Mechatronics, Aug. 2013, vol. 18, No. 4, pp. 1385-1396.

* cited by examiner

DRILLING SYSTEM AND METHOD THEREOF

This application claims the benefit of Taiwan application Serial No. 108144073, filed Dec. 3, 2019, the disclosure of which is incorporated by reference herein in its entirety.

TECHNICAL FIELD

The disclosure relates in general to a drilling system, and more particularly to a drilling system for composite material and a method thereof.

BACKGROUND

With the features of lightweight and high strength, composite material has been widely used in many industries such as the aerospace industry and the auto parts industry. Most of industrial composite materials are formed of laminated layers of carbon fiber or reinforced polyester. During the manufacturing process, composite material will be delaminated or burred if the drilling force is too large. Delamination not only decreases the lifespan of a composite material, but also jeopardizes safety when the composite material is used in aerial vehicles. Therefore, it has become a prominent task for the industries to resolve the problems of generating delamination and burrs during the manufacturing process of the composite material.

SUMMARY

The disclosure is directed to a drilling system and a method thereof. The drilling force and the feed speed are controlled according to an approximate manual drilling approach to reduce the feed impact, stabilize the drilling force, and reduce the penetration force of getting through the workpiece. Also, when the drill just touches the workpiece, the drilling system further identifies the material type of the workpiece, and further selects suitable drilling parameters according to the identified material type to eliminate the delamination or burrs of the composite material.

According to one embodiment, a drilling system including a feed control module, a force control module, a hole breaking control module, a conversion module and a computing unit is provided. The feed control module is configured to set a feed force threshold and a feed speed threshold for the computing unit to determine whether a current mode satisfies a first conversion condition. The hole breaking control module is configured to set a drilling penetration force threshold and a drilling penetration speed threshold for the computing unit to determine whether the current mode satisfies a second conversion condition. The conversion module is configured to change a feed force and the feed speed according to the determination results of the first conversion condition and the second conversion condition. The force control module is configured to provide the feed force, and the feed force is a fixed value given that the first conversion condition is satisfied.

According to another embodiment, a drilling method including the following steps is provided. Whether a current mode satisfies a first conversion condition is determined according to a feed force threshold and a feed speed threshold. When the first conversion condition is satisfied, a fixed feed force is provided. Then, whether the current mode satisfies a second conversion condition is determined according to a drilling penetration force threshold and a drilling penetration speed threshold. When the second conversion condition is satisfied, the feed force and the feed speed are changed.

Figure 1:
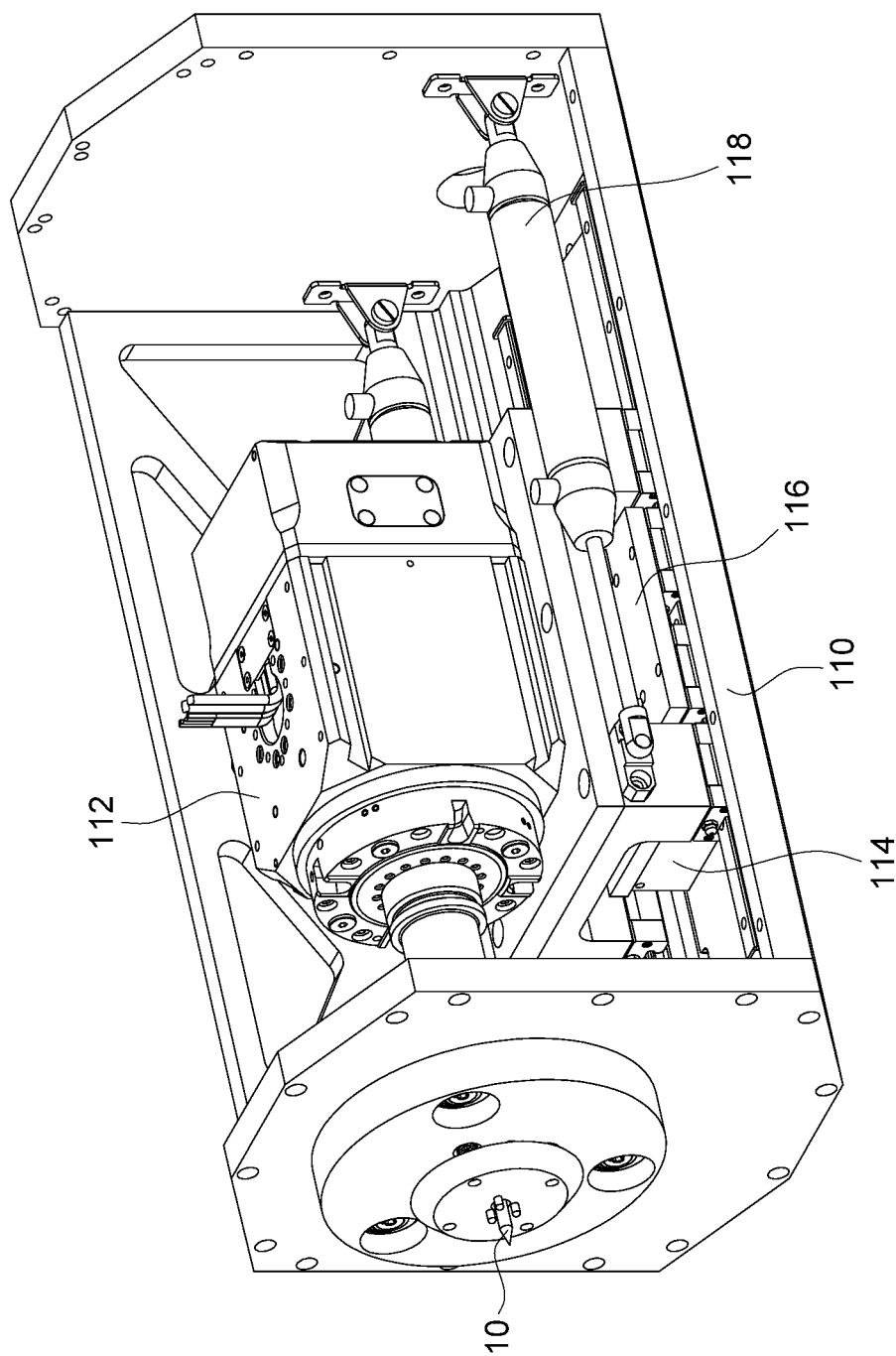
FIG. 1 is a schematic diagram of a processing platform according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/dentical designations are used to indicate similar/identical elements. Directional terms such as above, under, left, right, front or back are used in the following embodiments to indicate the directions of the accompanying drawings, not for limiting the present disclosure.

According to an embodiment of the disclosure, a drilling system and a drilling method thereof are provided. With impedance control and proportional-integral-derivation (PID) force smoothing control, the current mode is converted to a fixed force drilling mode form an impedance control mode, and then is further converted to the impedance control mode from the fixed force drilling mode to control the drilling force or the feed force and the feed speed and achieve an approximate manual drilling effect. In an embodiment, when the drill just touches the workpiece, the drilling system identifies the material type of the workpiece through machine learning and further decides the drilling parameters according to the identification result, such that the drilling effect can be enhanced, the delamination or burrs of the composite material can be eliminated, and the processing quality of the workpiece can be improved.

Figure 2:
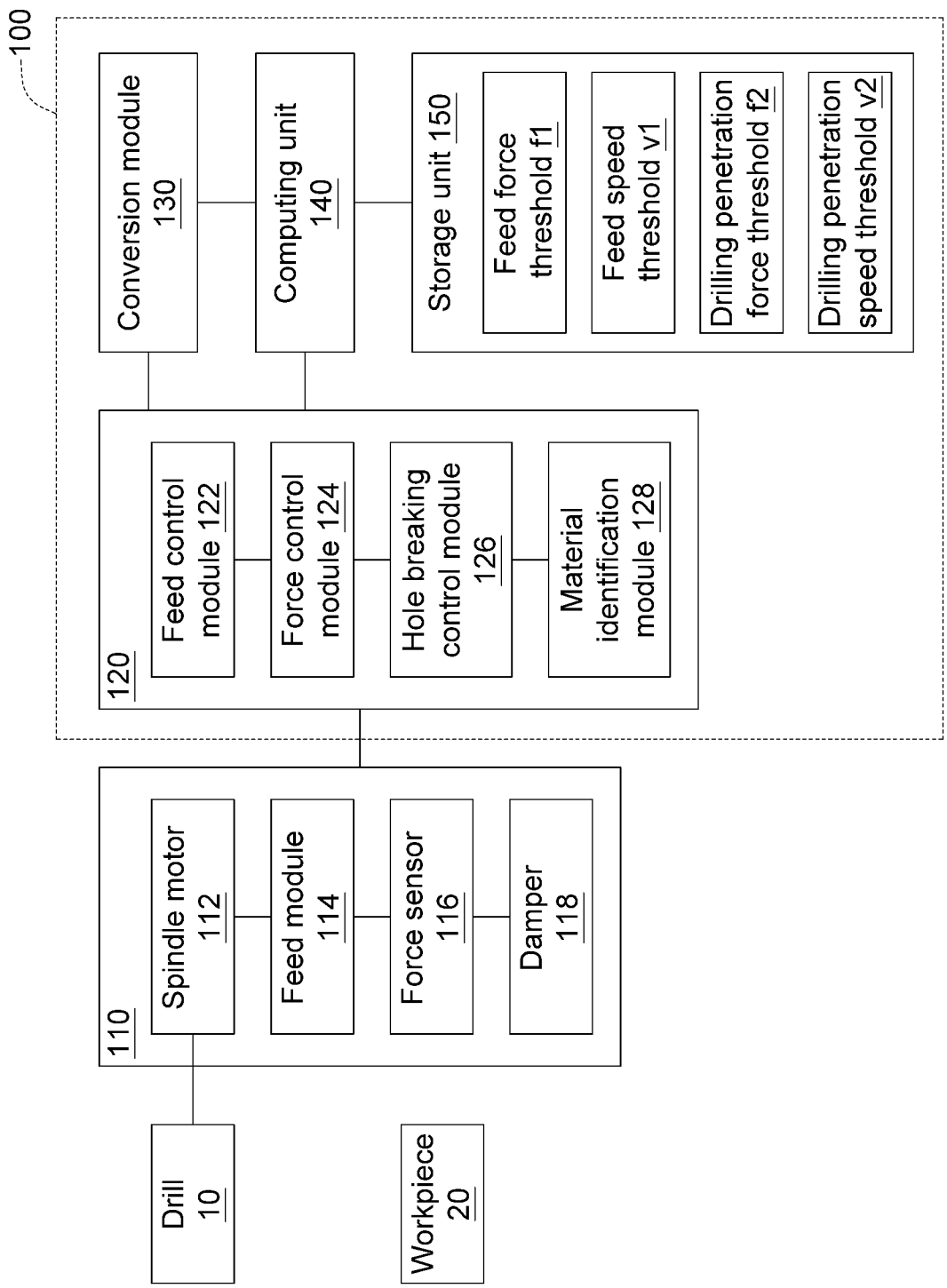
FIG. 2 is a schematic diagram of connecting a drilling system and a processing platform according to an embodiment of the disclosure.

Referring to FIG. 1, a schematic diagram of a processing platform 110 according to an embodiment of the disclosure is shown. In terms of hardware, the drilling system 100 of the disclosure in FIG. 2 is connected to the processing platform 110. The processing platform 110 carries a spindle motor 112, a feed module 114, a force sensor 116 and a damper 118. The processing platform 110 is fixed on a machine or a robotic arm (not illustrated). The drill 10 is disposed on the spindle motor 112. The drill 10 includes but is not limited to cutting tool, drilling tool, milling tool or boring tool. The spindle motor 112 is disposed on the feed module 114 for driving the drill 10 to rotate, and is driven by the feed module 114 to move linearly at a feed speed to feed a force to the workpiece 20 (such as a composite material). Besides, the force sensor 116 is disposed on the processing platform 110 for sensing the drilling resistance or the reaction force generated when the drill 10 touches the workpiece 20. Additionally, the damper 118 is connected between the processing platform 110 and the feed module 114 for providing a damping to the spindle motor 112 to buffer the drilling resistance or the reaction force generated when the drill 10 just touches the workpiece 20 or nearly gets through the workpiece 20 to reduce the feed impact.

In an embodiment, the feed module 114 can be a linear motor or a lead screw. The feed module 114 is not limited to a uni-axial feed unit, and can also be a multi-axial feed unit or a feed unit with multi-degrees of freedom. In an embodiment, the feed module 114 can be disposed on a preloading module (not illustrated) connected to the processing platform 110, which can therefore apply a preloading force to the workpiece 20 via the preloading module.

Also, the force sensor 116 can be a pressure sensor, a displacement sensor or a current sensor. The displacement signal or the current sensing signal can be converted to a force sensing signal to obtain the current processing state for the drilling system 100 to correspondingly generate a virtual impedance to offset the vibration of the spindle motor 112 or the processing vibration of the workpiece 20. The damper 118 can be but not limited to a hydraulic cylinder, a spring or a combination thereof.

Figure 3:
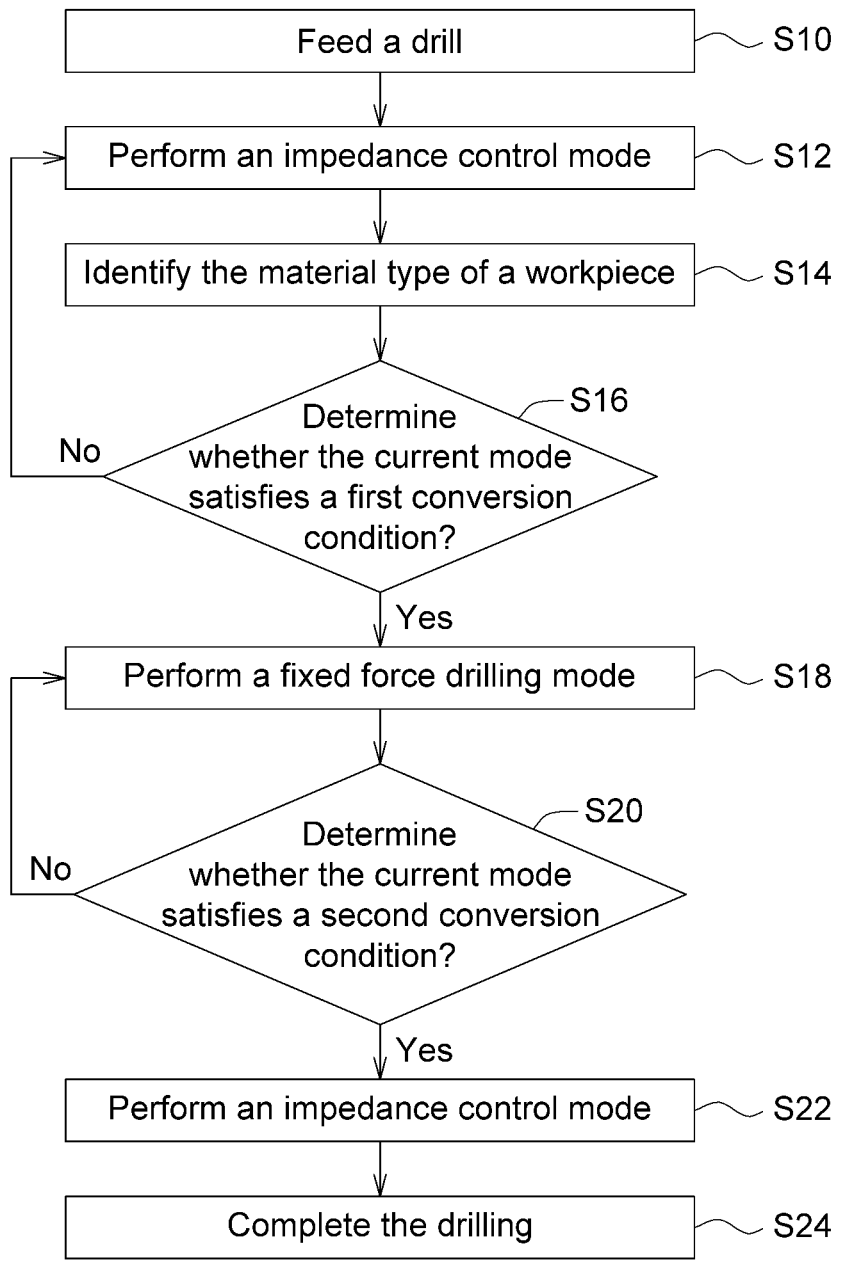
FIG. 3 is a flowchart of a drilling method according to an embodiment of the disclosure.

Refer to FIGS. 2 and 3. FIG. 2 is a schematic connection diagram of a drilling system 100 and a processing platform 110 according to an embodiment of the disclosure. FIG. 3 is a flowchart of a drilling method according to an embodiment of the disclosure. In terms of the control system, the drilling system 100 includes a feed control module 122, a force control module 124, a hole breaking control module 126, a material identification module 128, a conversion module 130, a computing unit 140 and a storage unit 150. The feed control module 122, the force control module 124, the hole breaking control module 126, the material identification module 128 and the conversion module 130 can be implemented by a control circuit, a programmable software, an application specific integrated circuit (ASIC), or a combination thereof. Besides, the computing unit 140 can be realized by a processor or a computer the storage unit 150 can be realized by a memory, a hard disc or a computer readable medium.

In an embodiment, to increase the stability of the drilling system 100 and the processing platform 110 when the drill 10 just touches the workpiece 20, the impedance control module 120 and the force control module 124 control the drilling force or the feed force and the feed speed to achieve an approximate manual drilling effect. Details of the impedance control module 120 and the force control module 124 of the drilling system 100 are disclosed below.

Refer to FIGS. 2 and 3. In step S10, a drill is fed. In an embodiment, before the drill 10 touches the workpiece 20, the feed control module 122 feeds the drill 10 at a constant speed to perform an impedance control mode S1 (step S12 of FIG. 3) until the drill 10 touches the workpiece 20. Once the drill 10 touches the workpiece 20, the feed control module 122 provides an impedance (such as a virtual impedance) to the processing platform 110 or the spindle motor 112 due to impedance control to reduce the landing impact and sets a feed force threshold f1 and a feed speed threshold v1 for the drill 10 being fed towards the workpiece 20. After receiving the current drilling resistance and feed speed of the drill 10, the computing unit 140 determines whether the drill 10 just touches the workpiece 20 (according to whether the drilling resistance is greater than the feed force threshold f1) and further determines whether the feed speed of the drill 10 just touching the workpiece 20 is smaller than the feed speed threshold v1 (i.e., determining whether the current mode satisfies the first conversion condition in step S16 of FIG. 3). The feed force threshold f1 and the feed speed threshold v1, which can be set via a man-machine interface or can be set automatically, are stored in the storage unit 150. That is, the user can set the feed force threshold f1 and the feed speed threshold v1 according to the size, type, and processing parameters of the drill 10 and the material type of the workpiece 20. Besides, before the drill 10 touches the workpiece 20, the feed control module 122 does not have to provide impedance or perform the impedance control mode. Instead, the feed control module 122 can accelerate the feeding of the drill 10 to save time, and the disclosure is not limited thereto.

In an embodiment, once the drill 10 touches the workpiece 20 (the drilling resistance is greater than the feed force threshold f1) and the feed speed of the drill 10 after touching the workpiece 20 is smaller than the feed speed threshold v1, then the first conversion condition is satisfied (the determination result in step S16 is affirmative). Meanwhile, the conversion module 130 converts the current mode (impedance control mode S1) to a fixed force drilling mode S2 (step S18 of FIG. 3). That is, the force control module 124 is informed to perform the fixed force drilling mode S2 (or change the feed force and the feed speed of the drill 10) to provide a fixed feed force with which the drill 10 continues to drill the workpiece 20 until the drill 10 nearly gets through the workpiece 20. If the first conversion condition is not satisfied (the determination result in step S16 is negative), then the method returns to step S12, in which the feed control module 122 continues to perform the previous impedance control mode S1. The conversion module 130 can be integrated in the computing unit 140.

Refer to FIGS. 2 and 3. In an embodiment, when the drill 10 nearly gets through the workpiece 20, the hole breaking control module 126 provides another impedance (such as a virtual impedance) to reduce the energy change of the drill 10 caused by the instant force getting through the workpiece 20, and sets a drilling penetration force threshold f2 and a drilling penetration speed threshold v2 of the drill 10 getting through the workpiece 20 for the computing unit 140 to determine whether the drilling resistance of the drill 10 nearly getting through the workpiece 20 is smaller than the drilling penetration force threshold f2 and determine whether the feed speed of the drill 10 nearly getting through the workpiece 20 is greater than the drilling penetration speed threshold v2 (i.e., determining whether the current mode satisfies the second conversion condition in step S20 of FIG. 3). The drilling penetration force threshold f2 and the drilling penetration speed threshold v2, which can be set via a man-machine interface or can be set automatically, are stored in the storage unit 150. That is, the user can set the drilling penetration force threshold f2 and the drilling penetration speed threshold v2 according to the size, type and processing parameters of the drill 10 and the material type of the workpiece 20, the disclosure is not limited thereto.

In an embodiment, when the drilling resistance of the drill 10 nearly getting through the workpiece 20 is smaller than the drilling penetration force threshold f2 and the feed speed of the drill 10 nearly getting through the workpiece 20 is greater than the drilling penetration speed threshold v2, the second conversion condition is satisfied (the determination result in step S20 is affirmative). Meanwhile, the conversion module 130 converts the current mode (the fixed force drilling mode S2) to a new impedance control mode (step S22 of FIG. 3) or the previous impedance control mode S1. Lastly, the drilling of the workpiece 20 is completed (step S24 of FIG. 3). That is, the hole breaking control module 126 is informed to perform the impedance control mode or change the feed force and the feed speed of the drill 10 (step S22 of FIG. 3). If the second conversion condition is not satisfied (the determination result in step S20 is negative), then the method returns to step S18, in which the force control module 124 continues to perform the fixed force drilling mode S2. In an embodiment, the force control module 124 includes a proportional-integral-derivative (PID) controller which smooths the change of the feed force over the time.

Figure 4:
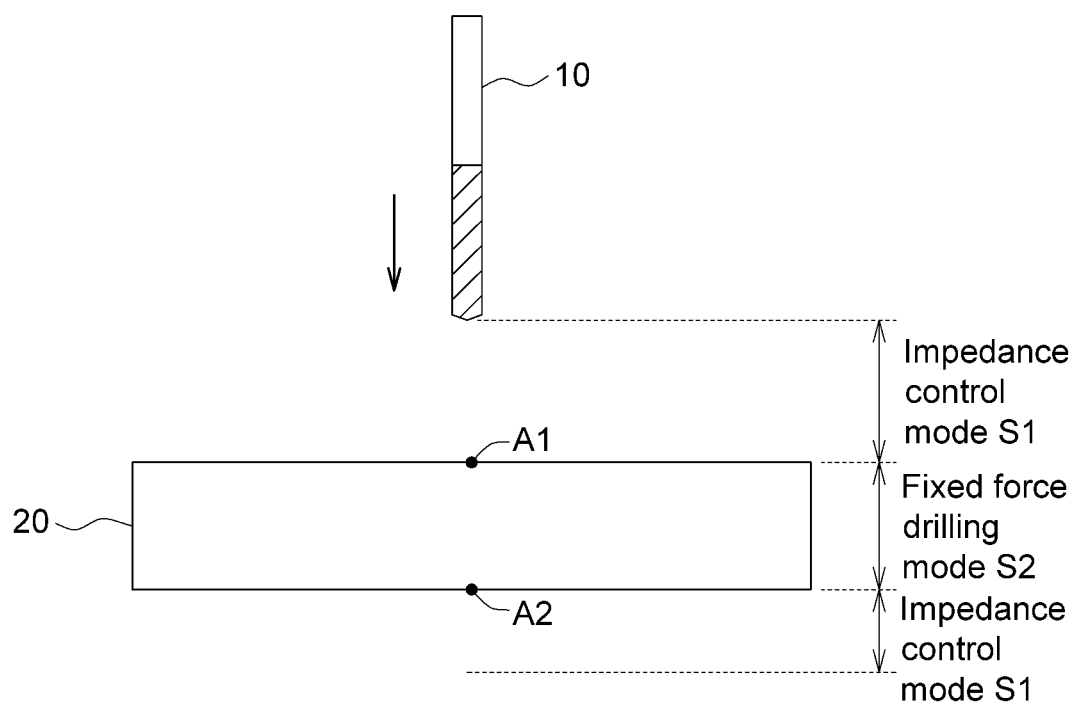
FIG. 4 is a schematic diagram of a drilling process according to an embodiment of the disclosure.
Figure 5:
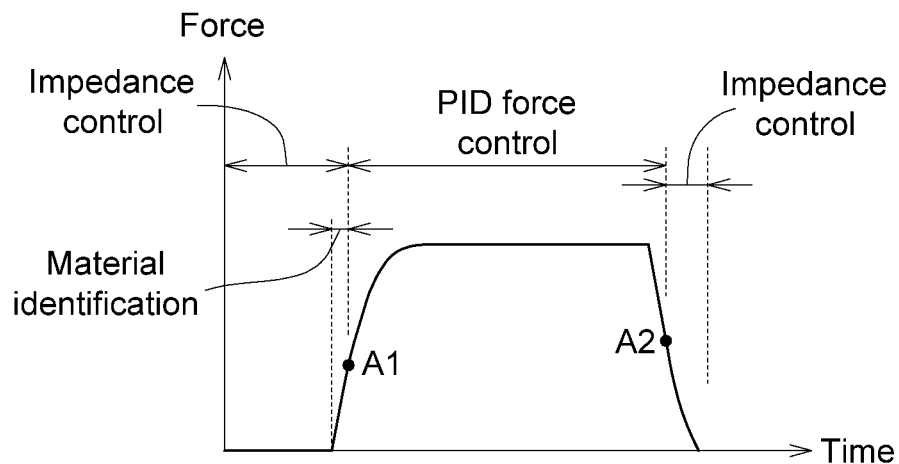
FIG. 5 is a schematic diagram of force control in the drilling process of FIG. 4.

As disclosed above, the conversion module 130 converts the current mode according to the first conversion condition and the second conversion condition to control the drilling force and the feed speed according to an approximate manual drilling approach so as to reduce the landing impact of the drill, stabilize the drilling force during the drilling force, and reduce the penetration force of getting through the workpiece 20. Refer to FIGS. 4 and 5. At the landing point A1, the landing impact of the drill 10 can be reduced through the impedance control mode S1, and the drill 10 is stably fed through the fixed force drilling mode S2 to stabilize the drilling force during the drilling process. At the exit point A2, the drill 10 is switched to the impedance control mode S1 and the energy change is reduced through a virtual impedance to reduce the penetration force with which the drill 10 gets through the workpiece 20 and avoid the workpiece 20 being delaminated.

Figure 6:
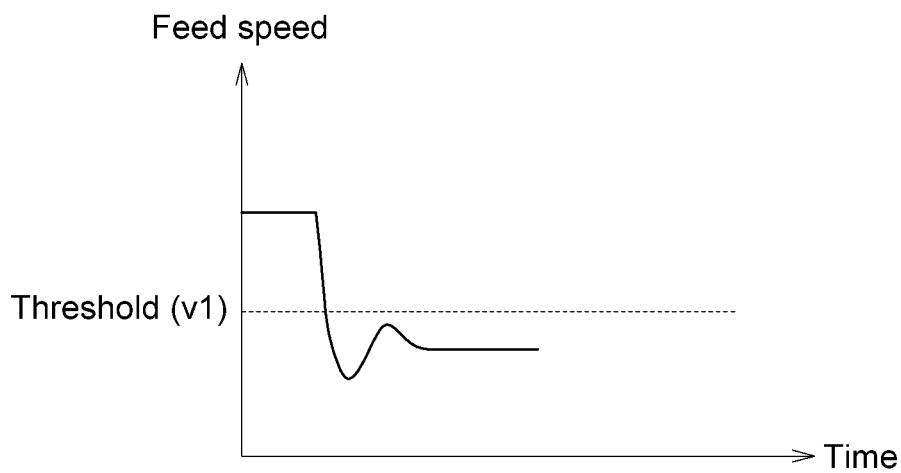
FIGS. 6 and 7 respectively are schematic diagrams of threshold settings in the drilling process of FIG. 4.
Figure 7:
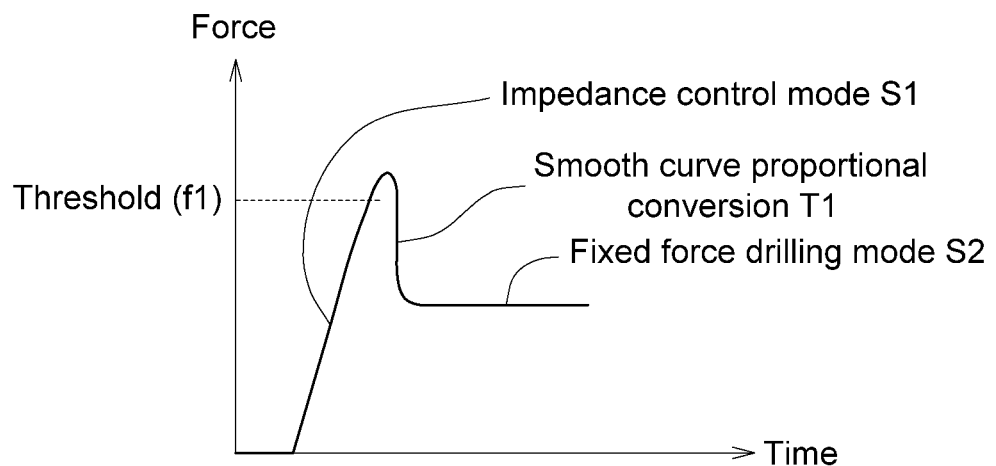

Refer to FIGS. 6 and 7. When the drill 10 just touches the workpiece 20, the feed control module 122 provides a drilling force and a feed speed according to the feed force threshold f1 and the feed speed threshold v1, and further converts the impedance control mode S1 to the fixed force drilling mode S2 through a smooth curve proportional conversion T1 to avoid the change in the drilling force or the feed force being too large during mode conversion. With the smooth curve proportional conversion T1, the proportional-integral-derivative controller of the force control module 124 smooths the change of the feed force over the time according to a proportional approach to avoid the change in the feed force being too large and causing the workpiece to be delaminated.

Refer to FIGS. 4 and 5. When the drill 10 just touches the workpiece 20, the feed speed will reduce, and the drilling resistance will increase and basically remain the same until the drill 10 completely enters the workpiece 20 (with PID force smoothing control). When the drill 10 nearly gets through the workpiece 20, the feed speed will increase, but the drilling impedance will decrease. Therefore, the computing unit 140 can determine whether the drill 10 just touches the workpiece 20 according to the feed force threshold f1 and the feed speed threshold v. By the same analogy, the computing unit 140 can determine whether the drill 10 nearly gets through the workpiece 20 according to the drilling penetration force threshold f2 and the drilling penetration speed threshold v2. For example, the drilling penetration force threshold f2 and the drilling penetration speed threshold v2 can respectively be set according to the drilling resistance being reduced by 50% and the feed speed being increased by 10% or 20%, but the disclosure is not limited thereto.

Refer to FIGS. 4 and 5. When the drill 10 just touches the workpiece 20, the drilling system 100 can selectively add a material identification module 128 to identify the material type of the workpiece 20 (step S14 of FIG. 3). For example, since the drilling force or the feed force varies with each composite material, the material type can be correctly determined by the material identification module 128, and processing parameter such as feed force can also be properly determined according to the identified material type. The material identification module 128 can identify the material of the workpiece 20 through a neural network. The inputted drilling force signal can create a trigonometric function through Fourier series. The characteristic values can be obtained by superposing and approximating the orthogonal cos and sin functions and inputted to the neural network. The output of the neural network is exactly the value of the target feed force. In an embodiment, the input parameters of the neural network may include processing parameters (such as impedance), drilling force signal (such as drilling resistance) and system state (such as feed speed), and the output of the neural network may include the material type and processing parameters of the workpiece 20. The neural network is trained to obtain the above output according to the drill data (such as the drill database) of the material of the workpiece 20 through machine learning.

According to the Fourier series, any function can be expanded as a trigonometric series:

$$\frac{1}{2}A_0 + \sum_{n=1}^{\infty}(A_n\cos nx + B_n\sin nx)$$

Wherein, $A_0$, $A_n$ and $B_n$ represent drilling force coefficients, and the trigonometric function cos and sin are orthogonal functions in the space. When the orthogonal basis is enough, approximate drilling force signal can be obtained. The drilling force coefficients are the characteristic values of the drilling force signal, and can be used as input parameters to replace a string of original signals.

As disclosed above, the drilling system 100 can identify the material type of the current workpiece 20 and further select suitable drilling parameters according to the identified material type of the workpiece 20 to eliminate the delamination or burring of the composite material.

Moreover, the drilling system 100 and the drilling method of the present embodiment can be used in a robotic arm processing system. With impedance control and PID force smoothing control, the robotic arm will not be deformed or displaced by the processing reaction force, hence increasing the processing precision of the robotic arm processing system.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A drilling system, connected to a processing platform having a drill for processing a workpiece, wherein the drilling system comprises:
a feed control module configured to provide a first impedance and set a feed force threshold and a feed speed threshold of the drill to determine whether a current mode satisfies a first conversion condition, and the first conversion condition is defined as a drilling resistance of the drill is greater than the feed force threshold and a feed speed of the drill is smaller than the feed speed threshold;

a hole breaking control module configured to provide a second impedance and set a drilling penetration force threshold and a drilling penetration speed threshold of the drill to determine whether the current mode satisfies a second conversion condition, and the second conversion condition is defined as the drilling resistance of the drill is smaller than the drilling penetration force threshold and the feed speed of the drill is greater than the drilling penetration speed threshold;

a computing unit configured to determine whether the drilling resistance and the feed speed of the drill satisfy the first conversion condition or the second conversion condition;

a force control module configured to provide a feed force to the drill, and the feed force is a fixed value given that the first conversion condition is satisfied; and a conversion module configured to convert the feed force and the feed speed according to a determination result of the first conversion condition or the second conversion condition.

2. The drilling system according to claim 1, further comprising a storage unit for storing the feed force threshold, the feed speed threshold, the drilling penetration force threshold and the drilling penetration speed threshold.

3. The drilling system according to claim 1, further comprising a material identification module for identifying a material type of the workpiece according to the drilling resistance, the feed speed and a drill database, which are obtained when the first conversion condition is satisfied, through machine learning.

4. The drilling system according to claim 1, wherein the computing unit firstly determines whether the first conversion condition is satisfied and subsequently determines whether the second conversion condition is satisfied.

5. The drilling system according to claim 1, wherein the first impedance and the second impedance respectively are provided to the processing platform by the feed control module and the hole breaking control module.

6. The drilling system according to claim 1, wherein the processing platform comprises a force sensor, a feed module and a damper, the force sensor detects the drilling resistance of the drill, the feed module drives the processing platform according to the feed speed, and the damper provides a corresponding damping to the processing platform according to the first impedance and the second impedance.

7. The drilling system according to claim 1, wherein the force control module comprises a proportional-integral-derivative (PID) controller for smoothing a change of the feed force of the drill over time according to a proportional approach.

8. A drilling method used in a processing platform having a drill for processing the workpiece, wherein the drilling method comprises:

providing a first impedance, and setting a feed force threshold and a feed speed threshold to determine whether a current mode satisfies a first conversion condition;

providing a second impedance, and setting a drilling penetration force threshold and a drilling penetration speed threshold to determine whether the current mode satisfies a second conversion condition;

determining whether the current mode satisfies the first conversion condition according to the drilling resistance and the feed speed of the drill, and when the first conversion condition is satisfied, the drilling method comprises providing the first impedance to the processing platform and change a feed force of the drill to a fixed value;

determining whether the current mode satisfies the second conversion condition according to the drilling impedance and the feed speed of the drill, and when the second conversion condition is satisfied, the drilling method comprises providing the second impedance to the processing platform and changing the feed force and the feed speed of the drill.

9. The drilling method according to claim 8, wherein the first conversion condition is defined as the drilling resistance of the drill is greater than the feed force threshold and the feed speed of the drill is smaller than the feed speed threshold.

10. The drilling method according to claim 8, wherein the second conversion condition is defined as the drilling resistance of the drill is smaller than the drilling penetration force threshold and the feed speed of the drill is greater than the drilling penetration speed threshold.

11. The drilling method according to claim 8, wherein after determining that the first conversion condition is satisfied, the drilling method further comprises identifying a material type of the workpiece according to the drilling resistance, the feed speed and a drill database through machine learning.

12. The drilling method according to claim 8, wherein the change of the feed force of the drill over time is smoothed according to a proportional approach.

13. The drilling method according to claim 8, wherein the processing platform comprises a force sensor, a feed module and a damper, the force sensor detects the drilling resistance of the drill, the feed module drives the processing platform according to the feed speed, and the damper provides a corresponding damping to the processing platform according to the first impedance and the second impedance.

* * * * *